Oct. 4, 1949.  A. L. GLAESER  2,483,728
METHOD AND APPARATUS FOR BURNING
HIGH MOISTURE CONTENT FUEL
Filed Sept. 18, 1945  2 Sheets-Sheet 1
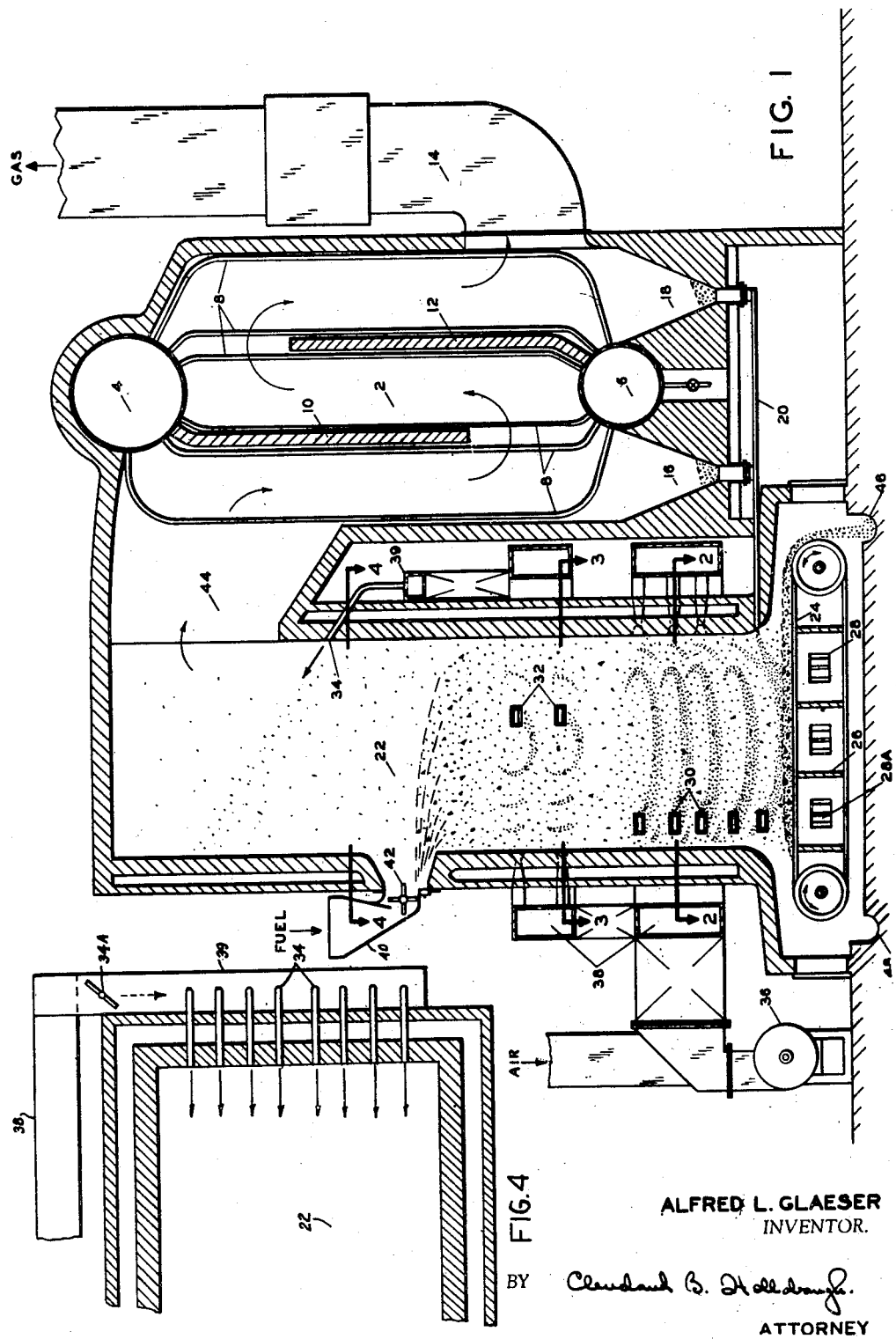
ALFRED L. GLAESER
*INVENTOR.*
BY Cleveland B. Hallbaugh
ATTORNEY

ALFRED L. GLAESER
INVENTOR.

ATTORNEY

Patented Oct. 4, 1949

2,483,728

UNITED STATES PATENT OFFICE 2,483,728

METHOD AND APPARATUS FOR BURNING HIGH MOISTURE CONTENT FUEL

Alfred L. Glaeser, Claymont, Del., assignor to Hercules Powder Company, Wilmington, Del., a corporation of Delaware Application September 18, 1945, Serial No. 617,066

11 Claims. (Cl. 110—7)

This invention relates to furnaces and, more particularly, to furnaces for burning comminuted fuel having a high moisture content and to an improved method for burning such fuel.

It is well known, when burning fuel with a high moisture content in a furnace, that it is necessary to either preheat the fuel to lower its moisture content to maintain ignition, or to supply an auxiliary fuel to the combustion chamber for the purpose of maintaining ignition. If these procedures are not utilized, the high moisture content fuel will accumulate on the grate of the furnace and cause loss of efficiency. However, preheating and the use of auxiliary fuels have not proved entirely satisfactory due to the additional equipment required for the purpose of preheating and due to added requirement of blending fuels to maintain ignition. Furthermore, it is frequently desired to use waste material of high moisture content as fuel. The requirement of additional material to blend with the waste material in order to sustain ignition detracts from the economic advantage sought in utilizing the waste material.

It is accordingly an object of the invention to provide a furnace which can be operated at high efficiencies while burning a fuel of high moisture content. Another object is to provide an apparatus for burning a high moisture content fuel partly in suspension and partly on a fuel bed.

It is a further object of the invention to provide an efficient method of burning fuel, particularly fuel having a high moisture content and in comminuted or finely-divided form.

Other objects of the invention will appear hereinafter, the novel features and combinations being set forth in the appended claims.

Generally described, the present invention comprises a vertical furnace having a flash drying zone, a volatilization and drying zone, a volatilization zone, and a carbon burning zone supported by a grate; and a method for burning a high moisture content fuel by subjecting the fuel sequentially to the aforementioned zones.

A preferred embodiment of the invention has been chosen for purposes of illustration and description and is shown in the accompanying drawings forming a part of the specification wherein reference symbols refer to like parts wherever they occur.

Fig. 1 is a vertical section through a steam generating furnace constructed in accordance with the invention.

Fig. 4 is a horizontal section through the combustion chamber of the steam generating furnace taken along line 4—4 of Fig. 1.

Figure 3:
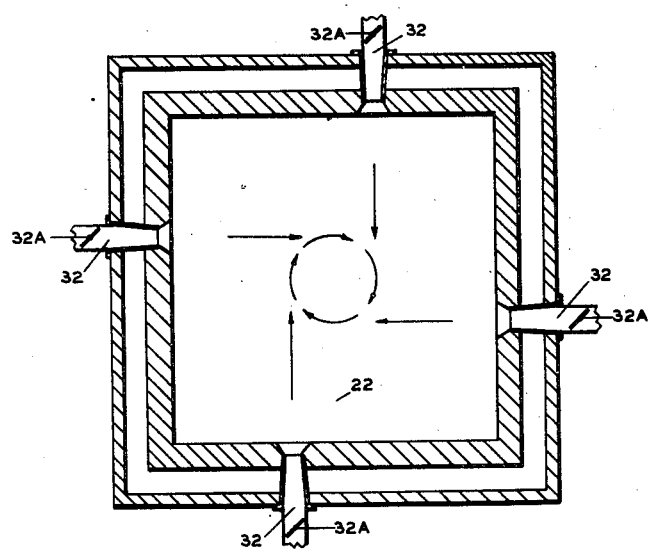
Fig. 3 is a horizontal section through the combustion chamber of the steam generating furnace taken along line 3—3 of Fig. 1.

In Fig. 1, the embodiment illustrated comprises a steam generating unit 2 of well-known type having an upper drum 4 and a lower drum 6 connected by banks of upright water tubes 8. A baffle 10 and a baffle 12 are provided between the interior banks of the water tubes 8 to conduct the hot gaseous products of combustion into intimate contact with the banks of water tubes and thence to a gas outlet, conduit 14. The refractory enclosing the steam generating unit 2 is laid up around the lower drum 6 to form a hopper 16 and a hopper 18 for collecting carbon and noncombustible fines carried by the gaseous products of combustion. A conduit 20 is connected to the hoppers 16 and 18 and air or other suitable means (not shown) is utilized for reinjection of the carbon and noncombustible fines into the combustion chamber of the furnace.

Figure 2:
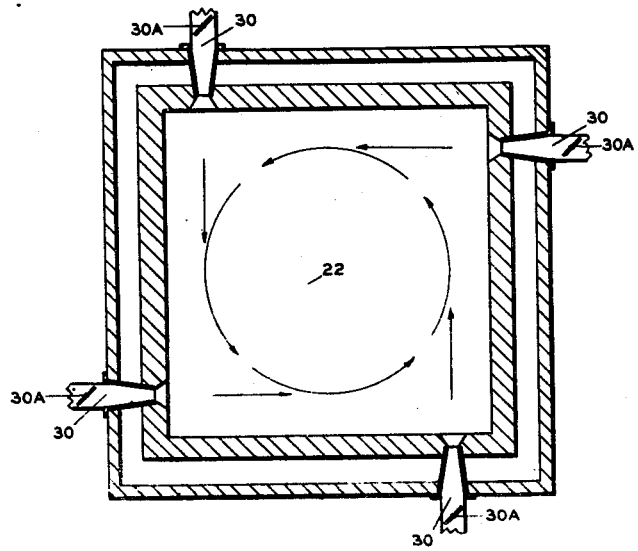
Fig. 2 is a horizontal section through the combustion chamber of the steam generating furnace taken along line 2—2 of Fig. 1.

In Figs. 1, 2, 3 and 4, the combustion chamber 22 is provided with a grate 24 of the traveling type which is adapted to be reversed in direction of travel. The grate 24 may be operated under either natural or controlled, forced draft, and suitable partitions 26 are provided for the distribution of combustion air. Combustion air is admitted, if desired, through openings 28 with dampers 28A in communication with respective zones formed by the partitions 26. A plurality of jets 30 with dampers 30A are provided in the lower portion of the combustion chamber 22 for admission of air for combustion. Each wall of the combustion chamber 22 has a series of the jets 30 vertically disposed at one side thereof to provide a tangential air stream as illustrated in Fig. 2. A second plurality of jets 32 with dampers 32A are provided in the intermediate portion of the combustion chamber 22 for admission of additional air. Each wall of the combustion chamber 22 has a series of the jets 32 vertically disposed at one side thereof, but other than the side the jets 30 are placed. These jets provide a tangential air stream as illustrated in Fig. 3. With reference to the specific embodiment illustrated in Figs. 2 and 3, it will be seen that the jets 30 create a levorotatory swirl and the jets 32 create a dextrorotatory swirl about the center of the combustion chamber. A third plurality of jets 34 are provided in the upper portion of the combustion chamber 22 for admission of further additional air. The jets 34 are inclined and disposed horizontally to provide a blanketing air stream, as illustrated in Fig. 4, for the fines and burning volatiles. These jets are positioned in the wall separating the combustion chamber 22 from the steam generating unit 2 and are located so as to provide a series of jets from which the direction of air flow tends to counter the flow of combustion gases to the furnace outlet. A fan 36 supplies air under pressure to manifolding conduit 38 which in turn supplies air to openings 28 and jets 30, 32, and 34. A conduit 39 connected to the manifolding conduit 38 is provided with a damper 34A for controlling the amount of air delivered by the jets 34.

A hopper 40 provided with a mechanical spreader 42 is positioned externally to the combustion chamber 22. The spreader 42 is controlled to supply a uniform distribution of fuel, from the hopper 40, substantially throughout the cross-sectional area of the combustion chamber 22, and the spreader is located to supply the fuel to that portion of the combustion chamber which is intermediate of jets 32 and 34.

Communication between the combustion chamber 22 and the steam generating unit 2 is provided through the passage represented by 44. Suitable ash sluices 46 and 48 are provided at each end of the grate 24 for disposal of ash so that the grate may be reversed in direction of travel continuously or intermittently to obtain an optimum distribution of material on the grate.

An example of the operation of the invention is given for the burning of waste wood chips. The wood chips were residuum obtained after extracting the turpentine, pine oil, and resinous components from pine wood. These chips had a moisture content in the order of 40 per cent by weight and varied in size from about ½ inch to about 2½ inches long and from about 1/32 inch to about ¼ inch in thickness together with a considerable percentage of fines. The chips were fed into the hopper and injected into the combustion chamber by means of the spreader. A gas stream velocity in the order of 180 feet per second was maintained in the combustion chamber by means of the jets. The descending chips traveled a torsional path due to the influence of the air streams emanating from the jets 30 and 32. Approximately 30 per cent of the chips were burned in suspension. The larger chips were suspended in the torsional path a sufficient amount of time to dry and thereafter rapidly ignite. Combustion was excellent throughout the entire chamber and no unburned carbon was carried by the grate 24 into the ash sluice 46. The volatiles were burned rapidly in the upper portion of the combustion chamber near the jets 34 and carbon carried over to the generating unit was in the order of 0.6 per cent by weight of the fuel (wood chips) fed to the combustion chamber. The carbon fines and sand fines collected in the hoppers 16 and 18 were reinjected into the combustion chamber from time to time without any apparent loss in combustion efficiency.

To better understand the relation of the various zones of the furnace when burning wood chips in accordance with the example, the following is given:

The chips introduced into the hot gases of the combustion chamber flash dried in about one-half second in the hot gas atmosphere (flash drying zone). The chips then fell by gravity through the hot combustion gases to a zone where drying was completed and volatilization started (volatilization and drying zone). In this zone, the chips mixed with preheated air introduced from the four sides of the combustion chamber to cause a whirling action. The volatiles of the chips were driven off and in an atmosphere of hot air combined to form gaseous products of combustion. As volatilizing continued, the chips passed by gravity to the next zone where they were again enveloped in a preheated air atmosphere, the air being introduced from the sides of the combustion chamber and in opposite whirling action to the zone above. In this zone (volatilization zone), the volatilization of the chip was completed, there remaining only the fixed carbon in the chip which falls by gravity to the upper run of the slow-moving grate (carbon burning zone). Preheated air was introduced underneath the upper run of the grate to complete the combustion of the carbon on the grate. Noncombustible impurities such as sand and ash in the fuel were deposited on the slow-moving grate and carried by the grate to the ash sluice. The portion of noncombustible impurities collected in the hoppers of the steam generating unit were also deposited on the slow-moving grate and carried to the ash sluice.

Since the chips varied in size from small particles to a large chip, the fine particles were carried upward by the hot gases of combustion. These fine particles were subjected to a rapid drying, volatilization and carbon burning time and the volatiles were driven off. If the fine particles were moved to the relatively cold surface of the boiler with insufficient air present, these particles would leave the combustion chamber unconsumed. To prevent this, additional preheated air was supplied at high velocity in a zone (blanketing zone) to complete the combustion of the volatiles and carbon fines which provides at the same time an air and gas blanket to prevent the fines as such from entering the passes of the steam generating unit. The blanketing zone is particularly valuable when burning fuels having a high content of volatiles and fines. For fuels low in volatiles and fines, this zone may be rendered inoperable by shutting down the air supply to the jets thereof, and still obtain satisfactory operation of the furnace.

It is evident that there are numerous factors which will influence conditions for the most satisfactory operation of the invention; however, the essential features in accordance with the method comprise sequentially subjecting a high moisture content fuel to a flash drying zone, a volatilization and drying zone, a volatilization zone, and a carbon burning zone. For fuels high in volatile matter and containing considerable fines, a blanketing zone increases the overall efficiency of combustion by burning the volatiles and tending to knock down the fines rising with the hot gases of combustion.

These zones are maintained in the combustion chamber, as described in inverse order to the flow of fuel by: the grate which supports the dried heavy particles of fuel and provides the carbon burning zone; the jets thereabove which swirl the fuel and provide the volatilization zone; the jets above the afore-mentioned jets which swirl the fuel in a countercurrent direction and provide the volatilization and drying zone; the meeting of the fuel with the hot gases of combustion with flashing of small and dried fuel particles which provides the flash drying zone; and the blanketing jets disposed thereabove which blanket the fines, provide combustion for volatiles from the flash drying zone and thereby maintain the blanketing zone.

It is further evident that the zones referred to above must be regulated to accommodate the particular fuel being utilized. Due to the variety of fuel which may be efficiently burned in accordance with the invention, the usual means of regulation, such as depth of fuel on grate, speed and kind of grate, amount and distribution of air, and observation of live fuel going over the end of the grate, are employed. Such means are not described, since they are well within the province of a person skilled in the art.

The fuel which may be efficiently burned in accordance with the present invention includes wood, charcoal, straw, tanbark, bagasse, bituminous coal and the like, which has been comminuted, reduced, or separated, so that a proportion thereof will fall by gravity to the grate. Fuel high in moisture, such as spent tanbark, which usually contains 60 to 70 per cent moisture should be reduced so as to contain fewer dense particles as compared with a material, such as wood, which usually contains 30 to 40 per cent moisture. This is necessary in order to thoroughly dry the higher moisture content material and is accomplished by reducing the material so that an increased percentage is dried in the turbulent gaseous stream. The utility of the invention is especially realized when employing fuel containing a moisture content of from about 20 to about 80 per cent, preferably from about 30 to about 50 per cent, and sufficient heating value to maintain combustion in conjunction with such moisture content.

The air may or may not be preheated for satisfactory operation; however, preheated air serves as another means for obtaining proper regulation of the furnace and maximum efficiency. The air may be preheated by heat exchange with the exit gases of combustion or other suitable means.

The grate, jets, hopper, spreader, and reinjection apparatus may be of conventional design. The grate may be of the moving or stationary type, with the former preferred with reversible control as hereinbefore mentioned. The spreader may be an individual unit or a plurality of units, the essential feature residing in thorough distribution of fuel by suitable fuel injection means. Moreover, the fuel may be injected into the combustion chamber through the top of the chamber, or one or more of the side walls, or a combination thereof to obtain a distribution of fuel substantially coextensive with the cross section of the combustion chamber.

The combustion chamber may be provided with water walls to augment the steam generating unit.

The advantages of the apparatus and method of the present invention are multifold. A greater quantity of high moisture content fuel can be burned per square foot of projected furnace area than can be burned in commercial equipment and consequently the steaming capacity of boilers can be increased. A higher fuel burning rate per square foot of projected furnace area is provided and the overall cost of a combined unit, furnace, boiler and appurtenances is materially reduced per unit of installed steaming capacity. Waste materials heretofore considered economically unfeasible as fuels may now be utilized.

What I claim and desire to protect by Letters Patent is:

1. A furnace having in combination walls forming an elongated vertical combustion chamber, an upper exit passage for products of combustion communicating with the combustion chamber, a grate at the bottom of the combustion chamber, means disposed below said exit passage for injecting a solid fuel in dispersed state substantially coextensive with the cross section of the combustion chamber, a plurality of air jets disposed a substantial distance above said grate and the fuel thereon for projecting a tangential air flow within the chamber, and a second plurality of air jets disposed above the first plurality of air jets and adjacent to but below said fuel injection means for projecting a second tangential air flow countercurrent to the air flow of said first plurality of air jets whereby the fuel descending from said fuel injection means passes through the air from said jets and the gases of combustion rising from said grate.

2. A furnace having in combination walls forming an elongated vertical combustion chamber, an upper exit passage for products of combustion communicating with the combustion chamber, a grate at the bottom of the combustion chamber, means disposed below said exit passage for injecting a solid fuel in dispersed state substantially coextensive with the cross section of the combustion chamber, a series of air jets disposed below said exit passage but above said fuel injection means adapted to project an air flow across the combustion chamber, a plurality of air jets disposed a substantial distance above said grate and the fuel thereon for projecting a tangential air flow within the chamber, and a second plurality of air jets disposed above the first plurality of air jets and adjacent to but below said fuel injection means for projecting a second tangential air flow countercurrent to the air flow of said first plurality of air jets whereby the fuel descending from said fuel injection means passes through the air from said two last-named plurality of jets and the gases of combustion rising from said grate.

3. A furnace having in combination walls forming an elongated vertical combustion chamber, an upper exit passage for products of combustion communicating with the combustion chamber, an endless grate at the bottom of the combustion chamber provided with means disposed beneath the upper run thereof for admission of air into the combustion chamber, means disposed below said exit passage for injecting a solid fuel in dispersed state substantially coextenive with the cross section of the combustion chamber, a series of air jets disposed below said exit passage but above said fuel injection means adapted to project an air flow across the combustion chamber, a plurality of air jets disposed a substantial distance above said grate and the fuel thereon for projecting a tangential air flow within the chamber, and a second plurality of air jets disposed above the first plurality of air jets and adjacent to but below said fuel injection means for projecting a second tangential air flow countercurrent to the air flow of said first plurality of air jets whereby the fuel descending from said fuel injection means passes through the air from said two last-named plurality of jets and the gases of combustion rising from said grate.

4. The method of burning high moisture content, finely-divided fuel in a furnace which comprises the steps of passing the fuel in dispersed state downwardly countercurrent to gases of combustion, reducing the moisture and volatile content of the fuel by successively subjecting the fuel to a first turbulent air flow in the presence of hot gases of combustion and thereafter to a second turbulent air flow in the presence of hot gases of combustion as the fuel passes downwardly through the gases of combustion, the second turbulent air flow being countercurrent to the first turbulent air flow, depositing the unconsumed fuel on a grate at the bottom of the furnace and subjecting the same to air to support combustion which aids in supporting combustion in said turbulent zone, and moving the grate to discharge ashes of combustion.

5. The method of burning high moisture content, finely-divided fuel in a furnace which comprises the steps of passing the fuel in dispersed state downwardly countercurrent to gases of combustion, reducing the moisture and volatile content of the fuel by successively subjecting the fuel to a first turbulent air flow of preheated air in the presence of hot gases of combustion and thereafter to a second turbulent air flow of preheated air in the presence of hot gases of combustion as the fuel passes downwardly through the gases of combustion, the second turbulent air flow being countercurrent to the first turbulent air flow, depositing the unconsumed fuel on a grate at the bottom of the furnace and subjecting the same to air to support combustion which aids in supporting combustion in said turbulent zone, and moving the grate to discharge ashes of combustion.

6. The method of burning high moisture content, finely-divided fuel in a furnace which comprises the steps of passing the fuel in dispersed state downwardly countercurrent to gases of combustion, reducing the moisture and volatile content of the fuel by successively subjecting the fuel to a first turbulent air flow of preheated air in the presence of hot gases of combustion and thereafter to a second turbulent air flow of preheated air in the presence of hot gases of combustion as the fuel passes downwardly through the gases of combustion, the second turbulent air flow being countercurrent to the first turbulent air flow, subjecting fines and volatile material carried above the zones of turbulent air flow to a blanketing air stream, depositing the unconsumed fuel on a grate at the bottom of the furnace and subjecting the same to air to support combustion which aids in supporting combustion in said turbulent zone, and moving the grate to discharge ashes of combustion.

7. The method of burning high moisture content, finely-divided fuel in a furnace which comprises the steps of passing the fuel in dispersed state downwardly countercurrent to gases of combustion, reducing the moisture and volatile content of the fuel by successively subjecting the fuel to a first turbulent air flow of preheated air in the presence of hot gases of combustion and thereafter to a second turbulent air flow of preheated air in the presence of hot gases of combustion as the fuel passes downwardly through the gases of combustion, the second turbulent air flow being countercurrent to the first turbulent air flow, subjecting fines and volatile material carried above the zones of turbulent air flow to a blanketing stream of preheated air, depositing the unconsumed fuel on a grate at the bottom of the furnace and subjecting the same to air to support combustion which aids in supporting combustion in said turbulent zone, and moving the grate to discharge ashes of combustion.

8. The method of burning high moisture content, finely-divided fuel in a furnace which comprises the steps of passing the fuel downwardly in a dispersed state and subjecting it to at least one tangential air stream to suspend the fuel in the presence of hot gases of combustion while passing hot gases of combustion upwardly through the suspended fuel to an upper outlet passage to reduce the moisture content of the fuel, burning the volatiles and a substantial part of the dried fuel in suspension, depositing the unconsumed fuel on a grate at the bottom of the furnace and subjecting the same to air to support combustion which aids in supporting combustion in said suspension zone, and moving the grate to discharge ashes of combustion.

9. The method of burning high moisture content, finely-divided fuel in a furnace which comprises the steps of passing the fuel downwardly in a dispersed state and subjecting it to at least one tangential air stream of preheated air to suspend the fuel in the presence of hot gases of combustion while passing hot gases of combustion upwardly through the suspended fuel to an upper outlet passage to reduce the moisture content of the fuel, burning the volatiles and a substantial part of the dried fuel in suspension, depositing the unconsumed fuel on a grate at the bottom of the furnace and subjecting the same to air to support combustion which aids in supporting combustion in said suspension zone, and moving the grate to discharge ashes of combustion.

10. The method of burning high moisture content, finely-divided fuel in a furnace which comprises the steps of passing the fuel downwardly in a dispersed state and subjecting it to at least one tangential air stream to suspend the fuel in the presence of hot gases of combustion while passing hot gases of combustion upwardly through the suspended fuel to an upper outlet passage to reduce the moisture content of the fuel, burning the volatiles and a substantial part of the dried fuel in suspension, subjecting fines and volatile material carried above the tangential air stream by the hot gases of combustion to a blanketing air stream, depositing the unconsumed fuel on a grate at the bottom of the furnace and subjecting the same to air to support combustion which aids in supporting combustion in said suspension zone, and moving the grate to discharge ashes of combustion.

11. The method of burning high moisture content, finely-divided fuel in a furnace which comprises the steps of passing the fuel downwardly in a dispersed state and subjecting it to at least one tangential air stream of preheated air to suspend the fuel in the presence of hot gases of combustion while passing hot gases of combustion upwardly through the suspended fuel to an upper outlet passage to reduce the moisture content of the fuel, burning the volatiles and a substantial part of the dried fuel in suspension, subjecting fines and volatile material carried above the tangential air stream by the hot gases of combustion to a blanketing air stream of preheated air, depositing the unconsumed fuel on a grate at the bottom of the furnace and subjecting the same to air to support combustion which aids in supporting combustion in said suspension zone, and moving the grate to discharge ashes of combustion.

ALFRED L. GLAESER.

REFERENCES CITED

The following references are of record in the file of this patent:

UNITED STATES PATENTS

| Number | Name | Date |
|---|---|---|
| 511,004 | Wegener | Dec. 19, 1893 |
| 762,344 | Parson | June 14, 1904 |
| 762,345 | Parson | June 14, 1904 |
| 1,530,321 | Pollock | Mar. 17, 1925 |
| 1,701,852 | Jackson | Feb. 12, 1929 |
| 1,701,854 | Jackson | Feb. 12, 1929 |
| 1,714,678 | Kreisinger | May 28, 1929 |
| 1,809,819 | Caller | June 16, 1931 |
| 1,863,181 | Bailey | June 14, 1932 |
| 1,943,949 | Coghlin | Jan. 16, 1934 |
| 1,947,460 | Coutant | Feb. 20, 1934 |
| 1,952,010 | Gregory et al. | Mar. 20, 1934 |
| 1,970,109 | Stratton | Aug. 14, 1934 |
| 2,072,450 | Hobson | Mar. 2, 1937 |
| 2,110,452 | Moyer | Mar. 8, 1938 |
| 2,114,619 | Ward | Apr. 19, 1938 |

FOREIGN PATENTS

| Number | Country | Date |
|---|---|---|
| 21,886 | Netherlands | May 15, 1930 |
| 441,824 | Germany | Mar. 14, 1927 |